United States Patent
Sun (12)

(10) Patent No.: US 6,331,606 B1
(45) Date of Patent: Dec. 18, 2001

(54) POLYESTER COMPOSITION AND PROCESS THEREFOR

(75) Inventor: Yanhui Sun, Wilmington, DE (US)

(73) Assignee: E. I. du Pont de Nemours and Comapny, Wilmington, DE (US)

( * ) Notice: Subject to any disclaimer, the term of this patent is extended or adjusted under 35 U.S.C. 154(b) by 0 days.

(21) Appl. No.: 09/727,792

(22) Filed: Dec. 1, 2000

(51) Int. Cl.$^7$ ................................... C08G 63/68
(52) U.S. Cl. .................. 528/295; 528/300; 528/301; 528/302; 528/308; 528/308.6
(58) Field of Search .................. 528/295, 300, 528/301, 302, 308, 308.6

(56) References Cited

U.S. PATENT DOCUMENTS

| | | | |
|---|---|---|---|
| 2,520,733 | 8/1950 | Morris et al. | 260/615 |
| 2,657,233 | 10/1953 | Carnahan | 260/544 |
| 4,611,049 | 9/1986 | Kuratsuji et al. | 528/279 |
| 5,097,004 | 3/1992 | Gallagher | 528/272 |
| 5,559,205 | 9/1996 | Hansen et al. . | |
| 6,075,115 | 6/2000 | Putzig et al. . | |

FOREIGN PATENT DOCUMENTS

| | | |
|---|---|---|
| 0 847 960 | 8/1998 | (EP) . |
| 1 006 220 | 6/2000 | (EP) . |
| 7-209811 | 8/1995 | (JP) . |
| 9-40855 | 2/1997 | (JP) . |
| 9-59601 | 3/1997 | (JP) . |
| 9-249742 | 9/1997 | (JP) . |
| 10-287740 | 10/1998 | (JP) . |
| 11-29630 | 2/1999 | (JP) . |
| 11-29685 | 2/1999 | (JP) . |
| 11-29763 | 2/1999 | (JP) . |
| 11-100722 | 4/1999 | (JP) . |
| 11-287790 | 10/1999 | (JP) . |
| WO99 WO 00/26301 | 2/1999 | (WO) . |
| A1 | 5/2000 | (WO) . |
| WO00/26301 | 5/2000 | (WO) . |

OTHER PUBLICATIONS

Chemical Fibers International, vol. 48, Dec. 1998, pp. 508–513.
Datye, Colourage, Feb. 1994, pp. 7–12.

*Primary Examiner*—Samuel A. Acquah

(57) ABSTRACT

A composition and a process for producing the composition are provided. The composition comprises repeat units derived from 1,3-propanediol; an organic acid, preferably a dicarboxylic acid, its salt, its ester, or combinations of two or more thereof; a polyether diol; and a sulfonated comonomer. The polyether diol can be present in the composition in the range of from about 10 to about 80 weight %. The process comprises contacting 1,3-propanediol with the organic acid, the polyether diol, and the sulfonated comonomer. The sulfonated comonomer can have the formula of $(R'OC(O))_2A(R)_zS(O)_2OM$ in which each R' can be the same or different and is each independently hydrogen, a $C_1$ to $C_4$ alkyl group, or a $C_1$ to $C_4$ hydroxyalkyl group; each R is independently a $C_1$ to $C_4$ alkyl group; A is an alkylene or arylene group; z is a number of from 0 to 2; and M is hydrogen, alkali metal ion, alkaline earth metal ion, quaternary ammonium, or ammonium ion.

28 Claims, No Drawings

POLYESTER COMPOSITION AND PROCESS THEREFOR

FIELD OF THE INVENTION

The present invention relates to a composition comprising a polyether diol and a sulfonated comononmer and to a process for producing the composition.

BACKGROUND OF THE INVENTION

Polyesters, especially polyalkylene terephthalates, have excellent physical and chemical properties and have been widely used for resins, films and fibers. In particular, polyester fibers have relatively high melting points, and can attain high orientation and crystallinity. Accordingly, polyesters have excellent fiber properties such as chemical, heat, and light stability, and high strength.

However, polyesters such as poly(propylene terephthalate) have relatively low toughness or impact strength when compared with other polymers such as poly (oxymethylene) (e.g., DELRIN available from E.I. du Pont de Nemours & Co., Wilmington Del.; hereinafter all terms written in upper cases are wither trade names or trademarks), nylon 66 (e.g., ZYTEL from the same source), and poly (butyleneterephalate-co-polytetramethylene glycol terephthalate) (e.g., HYTREL from the same source). Toughness is conventionally measured on an Instron machine (a tensile method, with units of in-lbf/in$^3$ or J/m$^3$). Impact strength is conventionally measured by the "Izod" test wherein a heavy pendulum swings against a standard notched bar of the polymer. The energy required to just break the bar is recorded in ft-lbf/in or in-lbf/in (J/m, see Test Methods below). Poly(propylene terephthalate) impact strength measured by the Izod test is about 0.5 ft-lbf/in (27 J/m). By comparison, other polymers such as poly (oxymethylene), nylon 66, and poly(butylenelpoly tetramethylene ether terephthalate) have impact strengths of about 1.3, 2, and 3.7 ft-lbf/in (69, 107, and 198 J/m) respectively.

In other applications of poly(propylene terephthalate), the polymer is found to be difficult to dye. The high levels of orientation and crystallinity that impart desirable properties to the polyester contribute to the difficulty in dyeing, but a major factor is that polyesters, unlike protein fibers, do not have ionic sites within the polymer chain that are reactive to basic or acid dye compounds. A number of comonomers can be copolymerized with the polyester or polyamide as a means of conferring basic dyeability. Notable examples are aromatic sulfonates, their sodium salts, and specifically the sodium salts of 5-sulfoisophthalic acid or of dimethyl 5-sulfoisophthalate. While the use of comonomers such as 5-sulfoisophthalate salts provide an effective site for cationic dyes, the comonomers do not improve impact strength.

Elsewhere, the introduction of "soft segments" into polymer chains has been found to improve impact strength. Examples of soft segments are sections of the polymer chain comprised of poly(oxyalkylene) units. However, the extent to which impact strength may be increased by the introduction of such soft segments is limited by concurrent reduction in the tensile strength.

WO099/09238 discloses a polyester fiber prepared from a polyester prepared by copolymerizing polytrimethylene terephthalate with a third component. The third component is an ester-forming sulfonate compound used in a comononmer ratio of 0.5 to 5% by mole.

U.S. Pat. No. 5,097,004 discloses polyesters based upon polyethylene terephthalate copolyrnerized with a polyethylene glycol and a 5-sulfoisophthalic acid and, if desired, a polyethylene ether such as diethylene glycol.

There remains a need to develop a composition and a process for improving further the impact strength of the polyester composition.

SUMMARY OF THE INVENTION

A composition that can be used to produce, for example, fiber, film, or plastic is provided. The composition comprises repeat units derived from 1,3-propanediol, an organic acid, a polyether diol, and a sulfonated comonomer in which the polyether diol is present in the composition in the range of from about 10 to about 80 weight %.

Also provided is a process for producing the composition disclosed above. The process comprises contacting 1,3-propanediol with the organic acid, the polyether diol, and the sulfonated comonomer.

DETAILED DESCRIPTION OF THE INVENTION

The term "organic acid", as discussed above can be a dicarboxylic acid, its ester, its salt, or combinations of two or more thereof. It can have the formula of $R'O_2CACO_2R'$ in which each $R'$ is independently selected from the group consisting of hydrogen, a $C_1$ to $C_4$ alkyl, a $C_1$ to $C_4$ hydroxyalkyl group, and combinations of two or more thereof. A is an alkylene group, an arylene group, or combinations thereof. An alkylene group can also contain unsaturation. Each A has about 2 to about 30, preferably about 3 to about 25, more preferably about 4 to about 20, and most preferably 4 to 15 carbon atoms per group. Examples of suitable dicarboxylic acids include, but are not limited to, terephthalic acid, isophthalic acid, naphthalic acid, succinic acid, adipic acid, phthalic acid, glutaric acid, oxalic acid, maleic acid, propanedioic acid, propenedioic acid, biphenylene dicarboxylic acid, and combinations of two or more thereof. The presently preferred dicarboxylic acid is terephthalic acid or ester thereof because the polyesters produced therefrom have a wide range of industrial applications.

Examples of suitable esters include, but are not limited to, dimethyl adipate, dimethyl phthalate, dimethyl terephthalate, dimethyl glutarate, and combinations of two or more thereof. The salt can be an alkali metal salt, an ammonium salt, or combinations of two or more thereof. The term "1,3-propanediol" can include a dihalopropane when the term "organic acid" is a salt. The preferred dihalopropane is 1,3-dichloroproane. Similarly, when a salt of organic acid is used, the term "polyether diol" refers to "polyether dihalide", such as polyether dichloride.

Generally, in the composition, the molar ratio of repeat units derived from the total organic acid to the repeat units derived from total diol is about 1:1. Total diol includes the monomer 1,3-propanediol and the polyether diol. When a salt of the organic acid is used in combination with a 1,3-dihalopropane, the molar ratio of repeat units derived from the total organic acid to the sum of the repeat units derived from the polyether diol and the propyl residue is about 1:1. The polyether diol can be an oligomers of a $C_3$ to $C_{12}$ alkane diol, having the structure Of H—[—O—$(C_aH_{2a})$—]$_b$—OH in which a is 3–12 and preferably 3–4, and b is 2–25 such that the molecular weight $[18+b(4_a+16)]$ is within the range 200–1500.

The weight proportion of the polyether diol incorporated into the polyester composition can be defined in terms of its weight percent and can be between 10 and 80%, preferably between 10 and 40% by weight.

Examples of preferred low molecular weight polyether diols include, but are not limited to, the low molecular weight poly(tetramethylene glycols) available from E.I. du Pont de Nemours & Co., Wilmington, Del. under the tradename TERATHANE, such as poly(tetramethylene glycol) with molecular weight in the range 200–1500 (when a=4= ~3–22 in the above formula) such as TERATHANE 650 and TERATHANE 1000). TERATHANE 650 having an average molecular weight of approximately 650 (when a=4, b =~8.5) and TERATHANE 1000 having an average molecular weight of approximately 1000 are particularly preferred. Poly(2,2-dimethyl-1,3-propanediol) or poly(neopentyl glycol) is a preferred example of a branched polyether diol.

The term "sulfonated comonomer" refers to, unless otherwise indicated, either aliphatic sulfonated dicarboxylic acid, ester thereof, or salt thereof; aromatic sulfonated dicarboxylic acid, ester thereof, or salt thereof; or combinations of two or more thereof. It can have the formula of (R'—O—C(O))$_2$—A(R)$_z$—S(O)$_2$—O—M in which R' and A are the same as those disclosed above. R is a $C_1$ to $C_4$ alkyl group or an aryl group. M is selected from hydrogen, an alkali metal ion, an alkaline earth metal ion, ammonium ion, quaternary ammonium ion, phosphonium ion, or combinations of two or more thereof. The subscript z is 0 to 2, inclusive.

Preferred sulfonated comonomer is an aromatic dicarboxylic acid, its salt, its ester, or combinations of two or more thereof. The preferred comonomer can have the formula of (R'—O—C(O))$_2$—Ar(R)$_z$—S(O)$_2$—O—M in which Ar is an arylene group such as a mono- or bicyclic aromatic nucleus optionally substituted with one or more groups R. R, R', z, and M are the same as those disclosed above Examples of suitable aliphatic sulfonated dicarboxylic acids include, but are not limited to, sulfosuccinic acid, 3-(2-sulfoethyl)hexanedioic acid, esters thereof, salts of the sulfonic acid, or combinations of two or more thereof. Examples of suitable aromatic sulfonated dicarboxylic acids include, but are not limited to, sulfonated phthalic acid, sulfonated isophthalic acid, sulfonated terephthalic acids, sulfonated naphthalene dicarboxylic acids, esters thereof, salts of the sulfonic acid, and combinations of two or more thereof. A preferred ester of a sulfonated aromatic dicarboxylic acid salt is dimethyl-5-sulfoisophthalate, sodium salt. A preferred example of a sulfonated aromatic dicarboxylic acid salt esterified with a $C_1$ to $C_4$ hydroxyalkyl group is bis(2-hydroxyethyl)-5-sulfoisophthalate, lithium salt. Presently, the preferred sulfonated dicarboxylic acid is dimethyl ester of 5-sulfo-isophthalic acid for it is useful as a comonomer for producing dyeable polyester.

The repeat units derived from sulfonated comonomer can be present in the polyester composition in any quantity so long as the composition has the desired properties. Examples of suitable quantity can be between 0.1 and 5 mole %, preferably between 1.0 and 1.25 mole %. The mole % comonomer in the final copolymer is the mole % comonomer unit of total polymer units. It is defined as: mole % comonomer=(moles of comonomer units in final polymer) ÷(moles of comonomer units in final polymer+moles of polymer repeating units)×100.

According to the invention, the polyester composition can be produced by a process comprising contacting 1,3-propanediol with the organic acid, the polyether diol, and the sulfonated comonomer. The polyether diol and the sulfonated comonomer are the same as those disclosed above.

Any contacting conditions known to one skilled in the art can be used. For example, 1,3-propanediol; an organic acid such as terephthalic acid, its esters, its salts, or combinations of two or more thereof; a sulfonated comonomer; and a polyether diol can be combined together in a suitable vessel or reactor to produce a polymerization medium.

Generally, the molar ratio of 1,3-propanediol to organic acid, in the polymerization medium, can be any ratio that can produce the composition can range from about 2:1 to about 1:1, preferably about 1.7:1 to about 1:1, and most preferably 1.5:1 to 1:1.

Any quantity of the polyether diol can be present in the polymerization medium as long as a composition disclosed above can be produced. Generally, the molar ratio of polyether diol to organic acid can be in the range of from about 0.03:1 to about 0.5:1, preferably about 0.03:1 to about 0.4:1, and most preferably about 0.03:1 to about 0.3:1. Similarly, the molar ratio of the sulfonated dicarboxylic acid to organic acid, in the polymerization medium, can be any ratio so long as the ratio can produce the composition disclosed above. The preferred ratio is in the range of from about 0.005: 1 to about 0.1: 1, more preferably 0.01:1 to 0.02:1.

The polymerization medium can comprise a catalyst. Suitable catalysts include those commonly employed by one skilled in the art in the esterification, transesterification, polycondensation, or combinations of two or more thereof. For example, tetraisopropyl titanate catalyst, or a functionally equivalent alkyl titanate catalyst such as those disclosed in U.S. Pat. No. 6,066,714, can be used. The catalyst can be present in an amount sufficient to provide about 1 to about 5000, preferably 10 to 1000 parts per million by weight (ppm) Ti in the final polyester composition.

The polymerization medium can also comprise a compound that can have a buffer capacity in a buffering amount such as those shown in the examples section. Suitable such compounds include, but are not limited to, sodium acetate, sodium formate, sodium citrate, potassium acetate, calcium acetate, zinc acetate, or combinations of two or more thereof.

The polymerization medium can further comprise an antioxidant to reduce the sensitivity of the resulting polymer to oxidation. Any antioxidants known to one skilled in the art such as IRGANOX 1098 available from Ciba Specialty Chemicals, New Jersey, can be used. An antioxidant, if used, can be present in the polymerization medium in an oxidation—reducing amount such as that shown in the examples.

The process can be carried out by heating the polymerization medium to a temperature sufficient to substantially or essentially dissolve the polymerization medium, esterify the organic acid and sulfonated comonomer, and produce a polyester composition, generally in the range of from about 100 to about 350° C., preferably about 110 to about 300° C., and most preferably about 140° C. to about 300° C.; under a suitable pressure, generally below atmospheric pressure, or vacuum; and for a sufficient period of time to produce a polyester composition.

Generally, if an ester of an acid is used, methanol distils from the reaction mass. If a salt of an acid and a dihalopropane are used, a halide is produced that can be removed from the polymerization medium by any means known to one skilled in the art.

TEST METHODS

Test Method 1. Tensile Toughness

Toughness is measured on an Instron machine according to the American Society for Testing Materials (ASTM) test method ASTM D-638. The results are expressed in units of in-lbf/in$^3$ (J/m$^3$). An advantage of this method is that small quantity of the polymer is required.

Test Method 2. Impact Resistance

Toughness is also measured in ft-lbf/in (J/m) by the IZOD method, for which a larger amount of sample than that required for Test Method 1 is required. The IZOD method is described by ASTM D-256. In some cases, the measurement is repeated after equilibration at 25° C. and 50% humidity for one week.

Test Method 3. Intrinsic Viscosity

Intrinsic viscosity (I.V.) is measured according to a Goodyear I.V. procedure, a modification of the ASTM test method D-2857. The Goodyear I.V. modification of the ASTM test method is to change the solvent to a 50/50% by weight mixture of trifluoroacetic acid and dichloromethane.

Test Method 4. Maximum Strength, Elongation at Breaks, and Modulus

Maximum strength, Elongation at break, and modulus are measured on an Instron machine according to the ASTM test method ASTM D-638.

Test Method 5. Hardness

Shore D Hardness is measured according to ASTM test method ASTM D-2240. In some cases, the measurement is repeated after equilibration at 25° C. and 50% humidity for one week.

MATERIALS

Dimethyl terephthalate, propanediol, dimethyl sulfoisophthalate (DRL-6), polytetramethlyene glycol (TERATHANE), and the alkyl titanate catalyst (titanium isopropoxide or TYZOR TPT) are all available from E.I. du Pont de Nemours & Co., Wilmington Del.

In Examples 1,2 and Comparative Examples A, B, a functionally equivalent alkyl titanate catalyst as disclosed in U.S. Pat. No. 6,066,714, disclosure of which is incorporated herein by reference, was used. TYZOR TPT and the functionally equivalent alkyl titanates may be used interchangeably, in amounts necessary to provide the 50–100 ppm Ti in the final polymer.

IRGANOX 1098 (N,N'-1,6-hexanediylbis[3,5-bis(1,1-dimethylethyl)-4-hydroxybenzenepropanamide; an antioxidant; CAS number, 23128-74-7) was obtained from Ciba-Geigy, Tarrytown, N.Y.

EXAMPLES

General Polymerization Process

All examples used dimethylterephthalate and 1,3-propanediol with other monomers as shown in Table 1A. The monomers, catalyst, and buffers were charged to the polymerization reactor (an autoclave or flask) and heated to 210–215° C. A 50% stoichiometric excess of the 1,3-propanediol was used; the excess distilled out during the process. After the eliminated methanol distilled out, the temperature was increased to 250° C. and the pressure reduced to 0.2–1 mm Hg (27–133 Pa) for the polycondensation phase. Polycondensation was continued until the viscosity impeded agitation. The polymer was cooled, chopped or ground into flakes, crystallized at about 175° C. for 4 hours, followed by solid phase polymerization at about 200° C. for about 4 hours to increase the intrinsic viscosity (I.V.) to about 1. The reactor size and ingredient variations were shown in Table 1A.

Example 1 illustrates preparation of poly(1,3-propanediol/terephthalate) or poly(trimethyleneterephthalate) containing poly(tetramethylene glycol) (polyether diol) and dimethyl-5-sulfoisophthalate, sodium salt.

To a 200-lb. autoclave, dimethylterephthalate, 1,3-propanediol, TERATFANE 1000, dimethyl-5-sulfoisophthalate, sodium salt, sodium acetate, and zinc acetate, were charged in the amounts shown in Table 1A, together with a functionally equivalent alkyl titanate catalyst as disclosed in U.S. Pat. No. 6,066,714 added in an amount sufficient to provide 50–100 ppm Ti in the final polymer (see above) to produce a mixture. The mixture was subjected to the above general polymerization process. For large-scale preparations, the polymer melt is extruded prior to chopping, crystallizing, and solid phase polymerization.

Example 2 and Comparative Example D were prepared in the 200-lb autoclave as Example 1.

Example 3 illustrates a laboratory scale preparation.

To a 2-L three-neck flask, dimethylterephthalate, 1,3-propanediol, TERATHANE 650, dimethyl-5-sulfoisophthalate, sodium salt, sodium acetate, and 0.25 g TYZOR TPT in 5 ml isopropanol were charged to produced a mixture. The mixture was subjected to the above general polymerization process.

Examples 4–6 and Comparative Examples B, C, and E were prepared in 2 liter flasks as Example 3.

Comparative Example A illustrates a commercial scale preparation, which is well known to one skilled in the art.

Poly(trimethyleneterephthalate) was prepared in a large-scale, batch two-vessel process. Molten dimethylterephthalate was added to 1,3-propanediol and an alkyl titanate catalyst (tetraisopropyl titanate, TYZOR TPT) in a transesterification vessel. The TYZOR TPT was added in an amount sufficient to provide 50–100 ppm Ti in the final polymer. The temperature was increased to 210° C. while methanol was removed. The resulting intermediate was transferred to a polycondensation vessel where the pressure was reduced to one mbar (100 Pa) and the temperature was increased to 250° C. When the desired melt viscosity was reached, the pressure was increased, and the polymer was extruded, cooled, and cut into pellets. The pellets were solid-phase polymerized to an intrinsic viscosity of about 1 dl/g (0.01 l/g) in a tumble dryer operated at 212° C. It is also referred to as control in Table 4.

TABLE 1A

Scale, Monomer, Catalyst, and I.V. for Examples 1–6

| Ex. # | Scale[a] | Buffer[b] (g) | Monomers as charged[c] (g, mol.) [Comonomer wt. %] | Catalyst | I.V.[e] dl/g (l/g) |
|---|---|---|---|---|---|
| 1 | AC | NaOAc (34.4) Zn(OAc)$_2$ (34.4) | DMT (53440, 275.3) 3G (31500, 413.9) T-1000 (8300, 8.3) [12.5] DRL-6 (820, 2.77) [1.3] | FE[d] | 1.00 (0.01) |

TABLE 1A-continued

Scale, Monomer, Catalyst, and I.V. for Examples 1–6

| Ex. # | Scale[a] | Buffer[b] (g) | Monomers as charged[c] (g, mol.) [Comonomer wt. %] | Catalyst | I.V.[e] dl/g (l/g) |
|---|---|---|---|---|---|
| 2 | AC | NaOAc (34.4) Zn(OAc)$_2$ (34.4) | DMT (53440, 275.3) 3G (31500, 413.9) T-650 (8300, 12.8) [12.5] DRL-6 (820, 2.77) [1.3] | FE | 0.96 (0.0096) |
| 3 | 2 L | NaOAc (0.495) | DMT (660.25, 3.4) 3G (388.11, 5.1) T-650 (128.05, 0.197) [15.0] DRL-6 (10.99, 0.037) [1.3] | TPT[f] (0.25) | 1.19 (0.0119) |
| 4 | 2 L | NaOAc (0.495) | DMT (592.28, 3.05) 3G (348.16, 4.575) T-650 (209.95, 0.323) [25.0] DRL-6 (10.99, 0.037) [1.3] | TPT (0.25) | 1.25 (0.0125) |
| 5[g] | 2 L | NaOAc (0.495) | DMT (413.62, 2.13) 3G (243.14, 3.192) T-650 (424.45, 0.653) [50.0] DRL-6 (10.99, 0.037) [1.3] | TPT (0.25) | 0.94 (0.0094) |
| 6[g] | 2 L | NaOAc (0.495) | DMT (413.62, 2.13) 3G (243.14, 3.192) T-650 (424.45, 0.6553) [50.0] DRL-6 (10.99, 0.037) [1.3] IRGANOX 1098 (3.79, —) [0.3] | TPT (0.25) | 0.98 (0.0098) |

[a]Polymerization Vessels: AC, 200-lb (90.7-kg) autoclave; 2 L, 2 liter 3-neck flask.
[b]Buffer: a buffer was used when DRL-6 comonomer was used.
[c]Monomers: DMT, dimethylterephthalate; 3G, 1,3-propanediol; T-1000; TERATHANE 1000; T-650, TERATHANE 650; DRL-6, dimethyl-5-sulfophthalate, sodium salt.
[d]Catalyst: FE, an alkyl titanate catalyst as disclosed in U.S. Pat. No. 6,066,714, used in an amount sufficient to provide 50–100 ppm Ti in the final polymer.
[e]Intrinsic Viscosity: I.V. measured according to Test Method 3.
[f]TPT: 0.25 g TYZOR TPT in 5 ml isopropanol added in an amount sufficient to provide 50–100 ppm Ti in the final polymer.
[g]It produced a product after polycondensation melting at about 175° C. The crystallization conditions were altered to 105° C. for 4 hours and the solid phase polymerization conditions to 125° C. for 8 hours.

TABLE 1B[a]

Scale, Monomer, catalyst, and I.V. for Comparative Examples A–E

| Ex. # | Scale | Buffer (g) | Monomers as charged (g; mol.) [Comonomer wt. %] | Catalyst | I.V. dl/g (l/g) |
|---|---|---|---|---|---|
| A | Com. | None | DMT:3G molar ratio 1:1.5 | TPT | 0.92 (0.0092) |
| B | 2 L | None | DMT (718.5, 3.7) 3G (418.17, 5.495) T-2000 (110.63, 0.055) [12.7] | FE | 1.19 (0.0119) |
| C | 2 L | None | DMT (718.5, 3.7) 3G (418.17, 5.495) T-1000 (110.0, 0.11) [12.7] | FE | 0.92 (0.0092) |
| D | AC | NaOAc (21.0) Zn(OAc)$_2$ (36.0) | DMT (31730, 163.4) 3G (19030, 250.1) DRL-6 (985, 3.32) [2.47] | TPT | 1.07 (0.0107) |
| E | 2 L | NaOAc (0.495) | DMT (722.4, 3.72) 3G (424.64, 5.587) T-650 (69.55, 0.107) [8.0] DRL-6 (11.2, 0.0378) [1.3] | TPT | 1.08 (0.0108) |

[a]See footnotes in Table 1A; Com.: large-scale 2-vessel commercial batch equipment.

Tables 1A and 1B show that all the compositions of the Examples and Comparative Examples have comparable intrinsic viscosity values. For Examples 1 and 2, TERATHANE 650 replaced TERATHANE 1000. Examples 3–5 contained increasing amounts of the polyetherdiol. In Example 6, an antioxidant was added to suppress color formation. Comparative Example A was poly(1,3-propanediol/terephthalate) without other monomers. Comparative Examples B and C were poly(1,3-propanediol/terephthalate) containing a polyetherdiol of higher and lower molecular weight than that shown in Examples 1–6. Physical properties of the Examples and Comparative Examples are shown in the following Tables.

Each of the polymers in the above Examples and Comparative Examples was injection molded at 260° C. into bars for tensile testing. Instron test results are shown in Tables 2A, 2B, 3, and 4.

TABLE 2A

Physical Properties of Polymers (Instron Test Speed 0.5 in/min, 0.21 mm/s)

| Test Method:<br>Example<br>TERATHANE<br>MW/wt % in polymer] | 4<br>Strength<br>psi<br>(kPa) | 4<br>Modulus<br>psi × 10$^{-3}$<br>(MPa) | 4<br>Elongation<br>% at<br>break | 1<br>Toughness<br>in-lbf/in$^3$<br>(MJ/m$^3$) | 5<br>Hard-<br>ness<br>Shore D | 2<br>Izod<br>ft.lbf/in<br>(J/m) |
|---|---|---|---|---|---|---|
| 1<br>1000/12.5 | 5986<br>(41272) | 166.3<br>(1147) | 178.5 | 7705<br>(53.51) | 78 | 0.54<br>(28.8) |
| 2<br>650/12.5 | 5506<br>(37963) | 181.2<br>(1249) | 241.3 | 9832<br>(68.28) | 78 | 2.23<br>(119) |
| 3<br>650/15 | 4738<br>(32667) | 107.2<br>(739) | 281.2 | 12256<br>(85.11) | 77 | 2.29<br>(122) |
| 4<br>650/25 | * | * | * | * | 72 | 20.82<br>(1111) |
| 5<br>650/50 | * | * | * | * | 43 | 4.11<br>(219) |
| Comparative Examples | | | | | | |
| A | 9583<br>(66072) | 281.1<br>(1938) | 14.5 | 931<br>(6.47) | 83 | 0.54<br>(28.8) |
| B | 6379<br>(43982) | 230.5<br>(1589) | 49.4 | 2463<br>(17.10) | 78 | — |
| C | 5947<br>(41003) | 181.2<br>(1249) | 98.5 | 4166<br>(28.93) | 78 | — |

*Indicated samples did not break under the set Instron conditions before the elongation reached the machine limit. Consequently the test speed was raised from 0.5 in/min (0.21 mm/s) to 20 in/min (8.47 mm/s). The higher speed results are show in Table 2B.
—, not measured.

TABLE 2B

Physical Properties of Polymers
(Instron Test Speed 20 in/min, 8.47 mm/s)

| Test Method:<br>Example<br>TERATHANE<br>MW/wt % in polymer | 4<br>Strength<br>psi<br>(kPa) | 4<br>Modulus<br>psi × 10$^{-3}$<br>(Mpa) | 4<br>Elongation<br>% at break | 1<br>Toughness<br>in-lbf/in$^3$<br>(MJ/m$^3$) |
|---|---|---|---|---|
| 2<br>650/12.5 | 6358<br>(43837) | 178.8<br>(1233) | 25.2 | 1392.1<br>(9.67) |
| 3<br>650/15 | 5637<br>(38866) | 122.9<br>(847) | 92.2 | 4196.7<br>(29.14) |
| 4<br>650/25 | 4029<br>(27779) | 64.8<br>(447) | 304.1 | 10835.2<br>(75.24) |
| 5<br>650/50 | 1447<br>(9977) | 10.2<br>(70) | 408.2 | 5400.6<br>(37.50) |
| A | 10493<br>(72347) | 279.7<br>(1928) | 12.1 | 1026.8<br>(7.13) |

Tables 2A and 2B show the increase in toughness and Izod impact strength for the Examples versus the Comparative Examples. The improvement in toughness provided by TERATHANE alone (Comparative Examples B and C versus A) was small compared with the use of TERATHANE and dimethyl sulfoisophthalate (in Examples 1 and 2). Examples 1 and 2 show the improvement in using the lower molecular weight TERATHANE. Comparative examples without sulfoisophthalate did not have enhanced dyeability. Tests in Tables 2A and 2B were performed on molded bars.

TABLE 3

Instron Tests on Polymer Films

| Composition | Strength psi<br>(kPa) | Modulus<br>psi × 10$^{-3}$<br>(MPa) | Elongation<br>(%) | Toughness<br>in-lbf/in$^3$<br>(MJ/m$^3$) |
|---|---|---|---|---|
| Example A: Poly(1,3-propanediol/terephthalate) | | | | |
| No additional<br>monomers | 6565<br>(45264) | 240.83<br>(1660) | 3.582 | 133<br>(0.92) |
| Example D: Poly(1,3-propanediol/terephthalate) containing DRL-6* | | | | |
| 2.47 wt % DRL-6<br>comonomer | 6899<br>(47567) | 244.61<br>(1686) | 3.658 | 150<br>(1.04) |

*DRL-6: Dimethyl sulfoisophthalate, see MATERIALS

Table 3 shows that poly(1,3-propanediol/terephthalate) modified by the incorporation of an ester of a sulfonated aromatic dicarboxylic acid salt without the TERATHANE had negligible improvement in toughness. Tests in Table 3 were performed on film samples and thus were not directly comparable with the physical property measurements on molded bars reported in Table 2.

TABLE 4

Instron Tests for Comparative Example E and
Poly(1,3-propanediol/terephthalate)

| Comparative<br>Example | Strength psi<br>(kPa) | Modulus<br>kpsi (kPa) | Elongation<br>(%) | Toughness<br>in-lbf/in$^3$<br>(MJ/m$^3$) |
|---|---|---|---|---|
| Poly(1,3-propanediol/terephthalate) | | | | |
| Control | 9375<br>(64638) | 2383<br>(16430) | 11.34 | 781.1<br>(5.42) |
| Comparative Example | | | | |
| E | 6246<br>(43065) | 2188<br>(15086) | 6.06 | 223.2<br>(1.55) |

Table 4 shows that TERATHANE 650 without dimethyl sulfoisophthalate did not provide the increase in toughness found when both were present (cf. Example 2 in Table 2). Tests in Table 4 were performed on molded bars. Comparative Example E also did not have enhanced dyeability.

What is claimed is:

1. A composition comprising repeat units derived from 1,3-propanediol, an organic acid, a polyether diol, and a sulfonated comonomer having the formula of $(R'O(O)C)_2A(R)_zS(O)_2OM$ wherein each R' is independently hydrogen, a $C_1$ to $C_4$ alkyl group, or a $C_1$ to $C_4$ hydroxyalkyl group; R is a $C_1$ to $C_4$ alkyl group; A is an alkylene group, an arylene group, or combinations thereof; z is a number from 0 to 2; M is hydrogen, alkali metal ion, alkaline earth metal ion, quaternary ammonium, an ammonium ion, or combinations of two or more thereof; and said polyether diol is present in said composition in the range of from about 10 to about 80 weight % and the molecular weight of said polyether diol is in the range of from about 200 to about 1500, and has the formula $H-(-O-(CH_2)_a-)_b-OH$ wherein a is 3 to 12 and b is 2 to 25.

2. A composition according to claim 1 wherein A is an arylene group.

3. A composition according to claim 1 wherein said sulfonated comonomer is selected from the group consisting of sulfosuccinic acid, 3-(2-sulfoethyl) hexanedioic acid, sulfonated phthalic acid, sulfonated isophthalic acid, sulfonated terephthalic acids, sulfonated naphthalene dicarboxylic acids, a salt of any of the sulfonic acids, an ester of any of these acids, and combinations of two or more thereof.

4. A composition according to claim 1 wherein a is 3 to 4.

5. A composition according to claim 2 wherein a is 3 to 4.

6. A composition according to claim 3 wherein a is 3 to 4 and the molecular weight of said polyether diol is about 650 or about 1000.

7. A composition according to claim 5 wherein said polyether diol is selected from the group consisting of poly(tetramethyleneglycols), poly(2,2-dimethyl-1,3-propanediol) or poly(neopentyl glycol), and combinations of thereof.

8. A composition according to claim 7 wherein said sulfonated comonomer is selected from the group consisting of 5-sulfoisophthalic acid, dimethyl-5-sulfoisophthalate sodium salt, and combinations thereof.

9. A composition according to claim 8 wherein said polyether diol is present in said composition in the range of from 10 to 40 weight %.

10. A composition according to claim 9 wherein said organic acid is selected from the group consisting of terephthalic acid, isophthalic acid, naphthalic acid, succinic acid, adipic acid, phthalic acid, glutaric acid, oxalic acid, maleic acid, propanedioic acid, propenedioic acid, biphenylene dicarboxylic acid, anb ester thereof, an alkali metal salt thereof, an ammonium salt thereof, and combinations of two or more thereof.

11. A composition according to claim 10 wherein said organic acid is terephthalic acid or its ester dimethyl terephthalate and said polyether diol is a poly(tetramethyleneglycol).

12. A composition according to claim 11 wherein said sulfonated comonomer is present in said composition in the range of from about 1 to about 1.25 mole %.

13. A composition comprising repeat units derived from 1,3-propanediol, an organic acid, a polyether diol, and a sulfonated comonomer wherein said organic acid is selected from the group consisting of terephthalic acid, isophthalic acid, naphthalic acid, succinic acid, adipic acid, phthalic acid, glutaric acid, oxalic acid, maleic acid, propanedioic acid, propenedioic acid, biphenylene dicarboxylic acid, or an ester thereof, an alkali metal salt thereof, an ammonium salt thereof, and combinations of two or more thereof;

said sulfonated comonomer is selected from the group consisting of sulfosuccinic acid, 3-(2-sulfoethyl) hexanedioic acid, sulfonated phthalic acid, sulfonated isophthalic acid, sulfonated terephthalic acids, sulfonated naphthalene dicarboxylic acids, a salt of any of the sulfonic acids, an ester of any these acids, and combinations of two or more thereof; and said polyether diol is present in said composition in the range of from about 10 to about 80 weight %; and said polyether diol is selected from the group consisting of poly(tetramethyleneglycols), poly(2,2-dimethyl-1,3-propanediol) or poly(neopentyl glycol), and combinations thereof and has a molecular weight in the range of from about 200 to about 1500.

14. A composition according to claim 13 wherein said organic acid is terephthalic acid or its ester dimethyl terephthalate; said sulfonated comonomer is 5-sulfoisophthalic acid or dimethyl-5-sulfoisophthalate sodium salt; and said polyether diol is a poly(tetramethyleneglycol).

15. A composition according to claim 14 wherein said polyether diol has a molecular weight of about 650 or about 1000.

16. A composition according to claim 15 wherein said polyether diol is present in said composition in the range of from 10 to 40 weight % and said sulfonated comonomer is present in said composition in the range of from about 1 to about 1.25 mole.

17. A process comprising contacting 1,3-propanediol with an organic dicarboxylic acid, a polyether diol, and a sulfonated comonomer having the formula of $(R'O(O)C)_2A(R)_zS(O)_2OM$ wherein each R' is independently hydrogen, a $C_1$ to $C_4$ alkyl group, or a $C_1$ to $C_4$ hydroxyalkyl group; R is a $C_1$ to $C_4$ alkyl group; A is an alkylene group, an arylene group, or combinations thereof; z is a number from 0 to 2; M is hydrogen, alkali metal ion, alkaline earth metal ion, quaternary ammonium, an ammonium ion, or combinations of two or more thereof, and said polyether diol is present in said composition in the range of from about 10 to about 80 weight % and the molecular weight of said polyether diol is in the range of from about 200 to about 1500.

18. A process according to claim 17 wherein said organic dicarboxylic acid, said polyether diol, and said sulfonated comonomer are as recited in claim 2.

19. A process according to claim 17 wherein said organic dicarboxylic acid, said polyether diol, and said sulfonated comonomer are as recited in claim 3.

20. A process according to claim 17 wherein said organic dicarboxylic acid, said polyether diol, and said sulfonated comonomer are as recited in claim 14.

21. A process according to claim 17 wherein said organic dicarboxylic acid, said polyether diol, and said sulfonated comonomer are as recited in claim 15.

22. A process according to claim 17 wherein said organic dicarboxylic acid, said polyether diol, and said sulfonated comonomer are as recited in claim 16.

23. A process according to claim 17 wherein said organic dicarboxylic acid, said polyether diol, and said sulfonated comonomer are as recited in claim 17.

24. A process according to claim 17 wherein the ratio of said polyether diol to said organic acid is in the range of from about 0.03:1 to about 0.5:1.

25. A process according to claim 21 wherein the ratio of said polyether diol to said organic acid is in the range of from about 0.03:1 to about 0.5:1.

26. A process according to claim 23 wherein the ratio of said polyether diol to said organic acid is in the range of from about 0.03:1 to about 0.5:1.

27. A process according to claim 24 wherein the ratio of said sulfonated comonomer to said organic acid is in the range of from about 0.005:1 to about 0.1:1.

28. A process according to claim 26 wherein the ratio of said sulfonated comonomer to said organic acid is in the range of from about 0.005:1 to about 0.1:1.

* * * * *